Patented Feb. 16, 1937

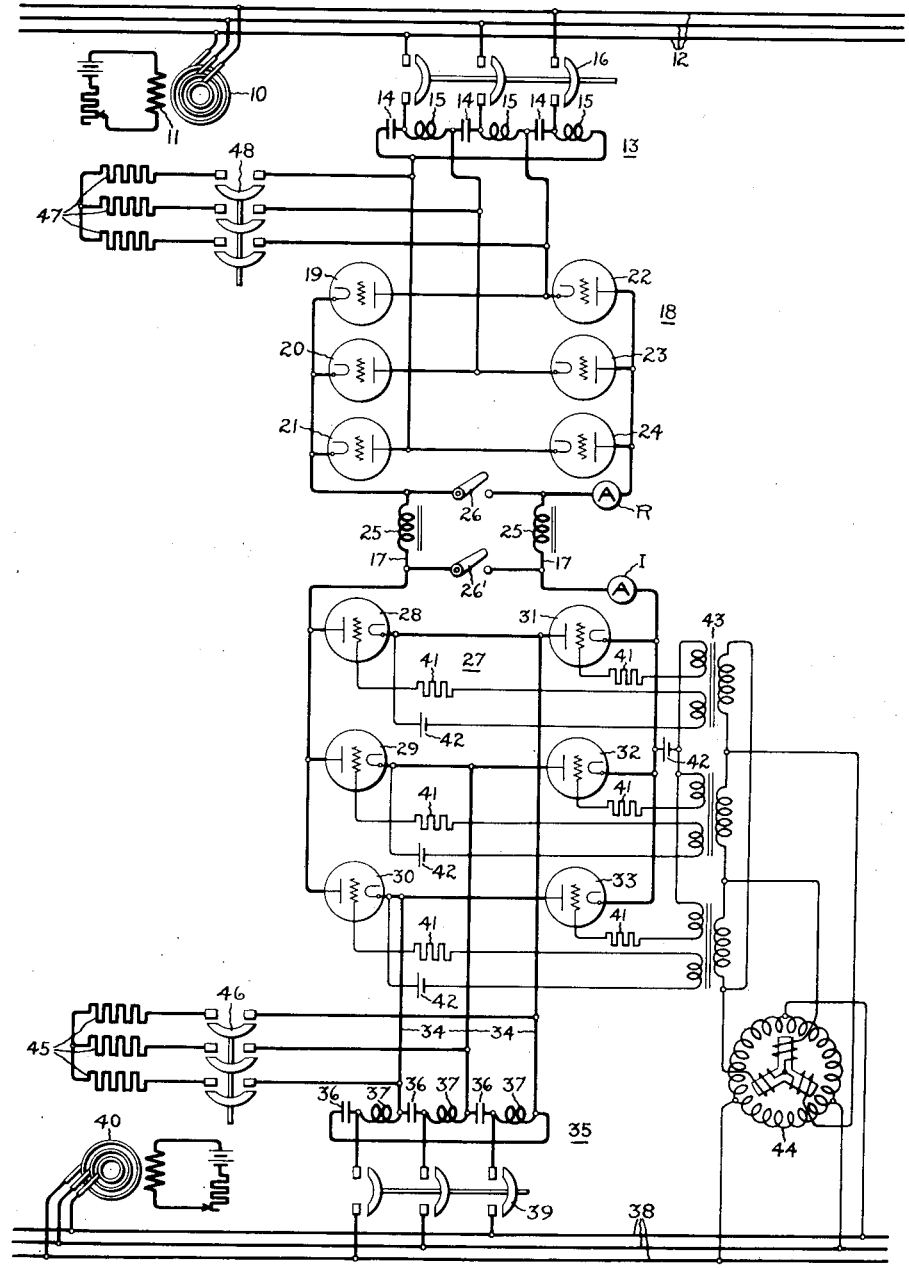

2,071,190

UNITED STATES PATENT OFFICE 2,071,190

ELECTRIC POWER TRANSMISSION

Clodius H. Willis, Princeton, N. J., and Burnice D. Bedford and Frank R. Elder, Schenectady, N. Y., assignors to General Electric Company, a corporation of New York Application March 24, 1936, Serial No. 70,576

10 Claims. (Cl. 171—97)

Our invention relates to electric power transmission and distribution systems and more particularly to the transmission and distribution of power with constant direct current by means of electronic devices.

While our invention is applicable for use in connection with electronic converting apparatus generally, it is particularly applicable for use in high voltage direct current power transmission systems of the type described and claimed in United States Letters Patent No. 1,990,758 granted February 12, 1935 upon an application of Charles W. Stone. In the system disclosed in the Stone patent, electric energy in the form of alternating current of constant voltage is transformed to alternating current of constant value and then rectified by electronic means and transmitted as constant direct current to electronic inverting means for changing the transmitted energy to alternating current of constant value, which in turn is converted back to alternating current of constant voltage. The electronic converting stations of this system employ as one means of transforming alternating current from constant voltage to constant current, or vice versa, monocyclic networks. In systems of this type it is desirable to provide starting means to check the operating condition of the circuit and the condition of some of the circuit elements, such as the electric valves of the electronic converting stations, in order to prevent undesirable voltage or current conditions while putting the system in operation.

It is an object of our invention to provide a new and improved method and apparatus for transmitting and distributing electric power by means of electronic converting apparatus.

It is another object of our invention to provide a new and improved method and apparatus for initiating operation of an electric transmission system of the type wherein energy is transmitted from a source of constant voltage alternating current to a receiving circuit of constant voltage alternating current by means of constant direct current.

In the United States Letters Patent No. 2,013,454 granted September 3, 1935 upon an application of Clodius H. Willis there is described and claimed a method and apparatus for initiating operation of a system of the type described above through control of the direct current circuit. In accordance with our present invention, the operation of the system is checked and initiated through means connected in the constant current alternating current circuit.

The novel features which we believe to be characteristic of our invention are set forth with particularity in the appended claims. The invention itself, however, both as to organization and method of operation, together with further objects and advantages thereof, will be best understood by reference to the following description taken in connection with the single figure of the accompanying drawing which is a diagrammatic representation of an embodiment of our invention.

Referring to the single figure of the accompanying drawing, a source of constant voltage alternating current 10 provided with a direct current excitation controlling means 11 is connected to energize an alternating current circuit 12. The alternating current of constant voltage from the circuit 12 is transformed to alternating current of constant value by means of a polyphase monocyclic network comprising capacitors 14 and inductors 15 connected in delta although other suitable polyphase connections such as the Y-connection may be used without departing from our invention in its broader aspects. Suitable switching means 16 is interposed between the alternating current circuit 12 and the monocyclic network 13. The constant current output from the monocyclic network 13 is rectified for transmission over a direct current transmitting circuit 17 by means of an electronic rectifier 18. The electronic rectifier may be of any suitable type but as shown comprises a group of similarly disposed electric valves 19, 20 and 21 connected to one side of the direct current circuit 17 and an oppositely connected group of electric valves 22, 23 and 24 which are connected to the other side of the direct current circuit 17. Each of the electric valves 19–24, inclusive, is provided with an anode, a cathode and a control electrode or grid, although no grid excitation circuit has been illustrated since for power flow in one direction it is sufficient for the purposes of our invention to explain the operation with simple rectification. However, any suitable grid excitation circuit may be used, such as the grid excitation circuit shown in connection with the electronic inverting means about to be described. Smoothing reactors 25 are connected in series relation with the direct current circuit 17. Short-circuiting switches 26 and 26' are connected across the direct current circuit 17, preferably at the respective converter stations, in order to provide means for effecting a short circuit of the direct current circuit 17 for purposes of control to be described. We connect current responsive devices indicated as R and I, respectively, in the direct current circuit at the respective converter stations for purposes of indicating a control. Constant direct current from the circuit 17 is inverted to alternating current of constant value by means of an electronic inverter 27. The inverter 27 comprises a group of similarly disposed electric valves 28, 29 and 30 connected to one side of the direct current circuit and an oppositely connected group of similarly disposed electric valves 31, 32 and 33 connected to the other side of the direct current circuit 17. Each of the electric valves 28–33, inclusive, is provided with an anode, a cathode and a control electrode or grid. The constant current alternating current from the inverter 27 is conducted by means of conductors 34 to the input terminals of a polyphase monocyclic network 35. The monocyclic network 35 comprises capacitors 36 and inductors 37 connected alternately in a delta connection, although any other suitable polyphase connection, such as a Y-connection, may be used without departing from our invention in its broader aspect. The constant potential alternating current terminals of the monocyclic network 35 are connected to a receiving circuit 38 through suitable switching means 39. The circuit 38 may be energized by a source of electromotive force 40 for determining the frequency of the receiving circuit in the event that no other frequency determining means is connected to the circuit.

By reason of the fact that the monocyclic network 35 effects a reversal of power factor angle between the constant potential circuit 38 and the constant current circuit 34, we may utilize phase commutation to commutate the current between the several similarly connected electric valves. This feature of the circuit as illustrated is described and claimed in a copending application, Serial No. 758,396, filed December 20, 1934 upon an application of C. H. Willis and B. D. Bedford and assigned to the assignee of the present application.

Although many refinements in excitation circuits have been developed for electronic converters for use in systems of this type, we have shown a simplified excitation circuit since the particular excitation circuit involved has no relation to our present invention. In order to render the electric valves 28–33, inclusive, alternately conductive and non-conductive in the proper sequence, the grid of each of these valves is connected to its respective cathode circuit through a current limiting resistor 41, a bias battery 42 and the proper phase winding of the secondary windings of grid transformers 43, the primary windings of which may be energized through any suitable phase shifting arrangement such as a rotary phase shifting transformer 44.

In accordance with our invention, a controllable low resistance path is provided across the alternating current constant current lines 34 during starting. As illustrated, this controllable low resistance path comprises three Y-connected resistors 45 which are connected across the lines 34 through suitable switching means 46. This starting resistance should be sufficiently high to cause a fair proportion of the current to flow through the electric valves of the electronic inverting means 27 and the direct current line. We have found it satisfactory to select resistors which will cause current to flow in the direct current circuit of the order of one-half normal full load current of the direct current circuit.

Even when the resistance is connected, it will be observed that the resistance 45 is effectively in parallel with the transmission line. By selecting a suitable value for the resistance 45, it will be possible to close the switch 46 and obtain a low voltage so that the circuit may be checked at low voltage. At the same time the operator may check all tubes at a relatively low voltage and be assured that these are ready to conduct current. Furthermore, the arrangement provides a means of gradually establishing a substantial current through the direct current line and the reactors 25 at a low voltage without danger of high voltage transients.

If it is desirable to arrange for power flow in either direction, or to check the rectifier station at the rectifier end, resistors 47 will be arranged to be connected to the constant current alternating current circuit of the monocyclic network 13 through suitable switching means 48.

The general principles of operation of the above described system will be understood by those skilled in the art and may be briefly summarized as follows: The alternating current constant voltage delivered to the bus 12 is transformed to alternating current of constant value by the monocyclic network 13, rectified by the electronic means 18 by full wave rectification in a well known manner, and delivered to the transmitting circuit 17 as direct current of constant value. The direct current of constant value is delivered to the electronic converter 27 and supplied to the receiving circuit 38 through the monocyclic network 35 as constant voltage alternating current.

In initiating operation of the system as described, we proceed substantially as follows. It will be assumed that initially all switches are in the open position and that we desire to initiate operation from the inverter or receiving end which is usually the station to determine when power shall be delivered. The operator will first put the electric valves 28–33 in condition to transmit current and then close the switch 46 to connect the resistor 45 across the constant current lines 34. The switches 26 and 26' for short-circuiting the direct current circuit 17 may also be closed to limit the active circuit at first to the inverter end. The switch 39 may then be closed to the receiving circuit which we shall assume to be energized at normal voltage. Under these conditions current will flow in the constant current line 34 to the resistor load 45 and to the electric valves 28–33 or at least a certain pair of said valves through the switch 26'. The resistor 45 limits the voltage stress on the monocyclic network and any part of the constant current circuit. The current responsive means I connected in the direct current circuit will now register a load current of the order of one-half normal with the assumed value of resistance for the resistor 45. Having checked the inverter end, the switch 26' may be opened and current will flow through the direct current transmission circuit 17 through the short-circuiting switch 26 at the rectifier end. This procedure enables a check to be made on the condition of the direct current circuit. At this stage of the procedure, the resistor 45 performs another function of acting as a buffer so that the current can be built up in the direct current line and reactors 25 gradually and at a low voltage without danger from relatively high voltage transients, which otherwise might occur in initiating current flow in the relatively highly inductive direct current circuit 17.

During this procedure at the receiving end, a similar procedure may be carried on at the generator end. That is, electric valves 19 to 24, inclusive, are put in condition to transmit current and the switch 48 is closed to connect the resistor 47 across the constant alternating current lines of the rectifier 18. The switch 16 is now closed and the operator at the rectifier end may check conditions at the rectifier end in the same manner as conditions were checked at the receiving end. When rectifier, receiving stations, and transmission line are in proper condition for transmitting power, the switch 26 may be opened. The current may rise to the normal load current but there may be no power transmitted. When the converters at the respective ends are adjusted to give the same current in the direct current circuit, the rectifier station is controlled by raising the constant potential voltage applied to the monocyclic network by generator voltage control or any suitable load control means such as that described and claimed in our application Serial No. (70,575) filed concurrently with this application and assigned to the assignee of the present application. In this arrangement, load control is effected by controlling the impedance of the capacitive or inductive elements of the monocyclic network. By effecting a small rise in current from the rectifier end the converter at the receiving end swings over to inverter action and take load because the monocyclic network associated with the inverter tries to hold constant current. In this way the direct current voltage and the corresponding load may be established. The manner of controlling the power flow is closely analogous to the control of power flow between two direct current constant voltage shunt generators. A small change in voltage of either shunt generator is sufficient to cause a large change in power flow. Similarly, in a constant current circuit of the type herein described a small change in current is sufficient to cause a large change in direct current voltage and therefore load. For example, as little as a five per cent change in current in our system is sufficient to effect a change in load from no load to full load.

While we have shown and described a particular embodiment of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States, is,—

1. In combination, an alternating current circuit of constant voltage, an electronic converter, a constant-voltage constant-current transforming means interposed between said circuit and said converter, and means connected to the constant-current alternating current circuit of said transforming means for limiting the currents therein to a predetermined value and at a predetermined voltage irrespective of the electrical condition of the constant-current circuit of said transforming means.

2. In combination, an alternating current circuit of constant voltage, an electronic converter, a constant-voltage constant-current transforming means interposed between said circuit and said converter, a direct current circuit connected to said converter, and means connected to the constant-current alternating current circuit of said transforming means for limiting the currents therein to a predetermined value and at a predetermined voltage irrespective of the electrical condition of said electronic converter and said direct current circuit.

3. In combination, an alternating current circuit of constant voltage, an electronic converter, a constant-voltage constant-current transforming means interposed between said circuit and said converter, a direct current circuit connected to said converter, means for short circuiting said direct current circuit, and means connected to the constant-current alternating current circuit of said transforming means for limiting the current in said direct current circuit when short circuited to a predetermined fraction of normal full load current at relatively low voltage.

4. In a system of distribution, an alternating current circuit of constant voltage, an electronic converter, a constant-voltage constant-current transforming means interposed between said circuit and said converter, a power absorbing circuit of predetermined impedance relative to the normal full load current of said system, and means for connecting said power absorbing circuit to the constant-current side of said transforming means.

5. In a system of distribution, an alternating current circuit of constant voltage, an electronic converter, a monocyclic network interposed between said circuit and said converter, a direct current circuit connected for energization with constant direct current from said converter, a resistance device having a predetermined value relative to the normal full load current of said direct current circuit, and means for connecting said resistance device across the constant-current side of said monocyclic network.

6. In a system of distribution, an alternating current circuit of constant voltage, an electronic converter, a monocyclic network interposed between said circuit and said converter, a direct current circuit connected for energization with constant direct current from said converter, a resistance load circuit, and means for connecting said resistance load circuit across the constant-current circuit of said monocyclic network, said resistance load circuit having a value of resistance such as to limit the current flow in said direct current circuit to a predetermined fraction of its normal full load current when said direct current circuit is subjected to a short circuit at any point thereof.

7. In a system of distribution, an alternating current circuit of constant voltage, an electronic converter, a monocyclic network interposed between said circuit and said converter, a direct current circuit connected for energization with constant direct current from said converter, means for selectively short circuiting said direct current circuit, a resistance load circuit, and means for connecting said resistance load circuit across the constant-current circuit of said monocyclic network, said resistance load circuit having a value of resistance such as to cause current of the order of one half normal full load current of said direct current circuit to flow therein to the point of short circuit when said direct current circuit is short circuited.

8. In a system of distribution, an alternating current circuit of constant voltage, an electronic converter, a monocyclic network interposed between said circuit and said converter, a second electronic converter, a transmission circuit interconnecting said converters, a second alternating current circuit of constant voltage, a second monocyclic network interposed between said second circuit and said second converter, a power absorbing circuit for connection to one of said monocyclic networks, and means for connecting a power absorbing circuit across the constant current side of one of said monocyclic networks for initially establishing current in said system of a predetermined value and at a predetermined voltage.

9. The method of initiating the operation of a transmission system of the type wherein energy is transmitted at constant direct current between alternating current circuits of constant voltage by means of electronic converting stations including monocyclic networks at the transmission and receiving ends of the system which comprises short circuiting the direct current circuit at one end of said systems, then establishing a predetermined impedance load across the constant-current circuit of the monocyclic network at the selected end to cause a predetermined current to flow in the converter and associated circuits of the end of the system which has been short circuited, then opening the short circuit and if a predetermined value of direct current flows in the direct current circuit removing the impedance load, and then increasing the current fed by the converter at the transmitting end until the converter at the receiving end swings over to inverter operation and supplies power to the receiving circuit.

10. The method of initiating the operation of a transmission system of the type wherein energy is transmitted at constant direct current between alternating current circuits of constant voltage by means of electronic converting stations including monocyclic networks at the transmitting and receiving ends of the system which comprises short circuiting the direct current circuit at both ends of said system, then establishing a predetermined impedance load across the constant current circuit of each monocyclic network to cause a predetermined current to flow in the respective converter stations and associated circuits, then opening the short circuit at one end of said system and establishing a predetermined current flow in the direct current transmission circuit, then removing the impedance load at the converting station which establishes current in the transmission line, then removing the impedance load at the other converting station, and then increasing the current fed by the converter at the transmitting end until the converter at the receiving end swings over to inverter operation and supplies power to the receiving circuit.

CLODIUS H. WILLIS.
BURNICE D. BEDFORD.
FRANK R. ELDER.